US006928479B1

(12) United States Patent
Meyer et al.

(10) Patent No.: US 6,928,479 B1
(45) Date of Patent: Aug. 9, 2005

(54) SYSTEM COMPUTER PRODUCT AND METHOD FOR PROVIDING A PRIVATE COMMUNICATION PORTAL

(75) Inventors: Steven P. Meyer, Thornhill (CA); Pedro P. Nascimento, Mississauga (CA); Andrew Cheung, Mississauga (CA)

(73) Assignee: 01 Communique Laboratory Inc., Ontario (CA)

( * ) Notice: Subject to any disclaimer, the term of this patent is extended or adjusted under 35 U.S.C. 154(b) by 665 days.

(21) Appl. No.: 09/595,533

(22) Filed: Jun. 16, 2000

(51) Int. Cl.[7] ............................................. G06F 15/16
(52) U.S. Cl. ...................... 709/227; 709/217; 709/218; 709/219
(58) Field of Search ...................... 769/100; 309/223, 309/224, 226, 227; 370/232, 490, 323, 242, 370/352, 102, 103, 104, 338, 342; 709/220, 709/221, 223, 224, 226, 230, 238, 217, 218, 709/227; 718/100; 713/201, 200

(56) References Cited

U.S. PATENT DOCUMENTS

| | | | |
|---|---|---|---|
| 5,708,655 A * | 1/1998 | Toth et al. .................. 370/313 |
| 5,790,548 A | 8/1998 | Sistanizadeh et al. | |
| 5,812,819 A * | 9/1998 | Rodwin et al. ............... 703/23 |
| 6,052,725 A * | 4/2000 | McCann et al. ............ 709/223 |
| 6,128,129 A * | 10/2000 | Yoneyama .................. 359/383 |
| 6,349,289 B1 * | 2/2002 | Peterson et al. .............. 705/34 |
| 6,381,650 B1 * | 4/2002 | Peacock ..................... 709/245 |
| 6,396,849 B1 * | 5/2002 | Sarkissian et al. .......... 370/490 |
| 6,397,254 B1 * | 5/2002 | Northrup ..................... 709/227 |
| 6,466,981 B1 * | 10/2002 | Levy .......................... 709/227 |
| 6,469,998 B1 * | 10/2002 | Burgaleta Salinas et al. ........................... 370/338 |
| 6,538,996 B1 * | 3/2003 | West et al. ................. 370/238 |
| 6,614,774 B1 * | 9/2003 | Wang ......................... 370/338 |
| 6,654,891 B1 * | 11/2003 | Borsato et al. ............. 713/201 |
| 6,665,715 B1 * | 12/2003 | Houri ......................... 709/223 |

FOREIGN PATENT DOCUMENTS

EP            0 836 301 A1       9/1997

OTHER PUBLICATIONS

George Lawton, "Dawn of the Internet Appliance", pp. 16 & 18, Los Alamitos, CA, U.S.A.
Mary Jander, "One-for-All Mail Call", pp. 78-88.
Klaus Haberstroh, "Kleingerate im Internet", pp. 38-40.

* cited by examiner

Primary Examiner—Majid Banankhah
(74) Attorney, Agent, or Firm—Eugene J. A. Gierczak; Miller Thomson LLP

(57) ABSTRACT

A system, computer product and method for providing a private communication portal at a first computer connected to a network of computers includes a communication facility resident at the first computer, and a second computer including a locating facility for locating the current location of the first computer on the network, where the second computer facilitates communication between the first computer and a third computer by authenticating the third computer for communication with the first computer and providing the location of the first computer for communication with the third computer.

46 Claims, 12 Drawing Sheets

SYSTEM COMPUTER PRODUCT AND METHOD FOR PROVIDING A PRIVATE COMMUNICATION PORTAL

FIELD OF THE INVENTION

This invention relates in general to a system, computer product and method for remotely accessing data at a private server using a remote wired or wireless web browser. This invention also relates to a system, computer product and method for remotely accessing and managing different types of messages at a private server using a remote wired or wireless web browser.

BACKGROUND OF THE INVENTION

Individuals and businesses today communicate through a variety of messages including electronic mail (including e-mails with video or voice attachments or AOL™ "instant messages"), pager messages, facsimile (fax) and electronic voice mail.

In many cases these messages are managed by more than one computer program. Such multi-program solutions are cumbersome as they generally require significant familiarity with more than one program and further require accessing each program to manage the receipt and dispatch of different types of messages. This results in loss of time and overly complex means for achieving user objectives.

Single programs for managing such variety of messages are known, but such known programs do not provide full remote access via the Internet to management of messages and contact information. The use of the Internet is desirable for numerous reasons, including the common use of the Internet Protocol as a communication standard, the general availability of electronic devices that are web-enabled and the cost savings of using the Internet. Full Internet access is desirable because message and contact management users may want to access their message and contact management system from a plurality of locations and/or plurality of communication devices (e.g. lap top, cellular phone or WAP-enabled hand held computer etc.). Full remote access permits the receipt of messages at any location on any type of communication device, with remote access to functions of the message management system such as address books, security settings, rules (e.g. automated response), text-to-speech functionality etc.

Prior art messaging systems and programs such as SYMANTEC's™ TALK WORKS PRO™, SIEMENS'™ XPRESSIONS470™ NOKIA/TELEKOL's™ INTEGRAX™, INTERSIS'™ VOIXX™, KONTACT's™ VEMA2.0™ and BLUEJADE.COM's™ TECS™ do not provide full Internet access as described above, and further particularized below.

Another disadvantage of such prior art systems (with the exception of TALKWORKS™) is that such systems and computer products require the use of a multi-user server. In other words, the "unified" capability of managing the variety of messages described is owned and managed by a $3^{rd}$ party service provider who acts as an intermediary between the user and entities with whom the user communicates.

It should be understood that by a "multi-user server", a server is meant that is configured for use by more than one "user".

There are numerous disadvantages to such prior art systems requiring such $3^{rd}$ party intermediaries. First, such prior art systems generally require payment of significant user fees, payable so long as the system is used. Second, such $3^{rd}$ party intermediary systems do not generally provide the full flexibility, customization, security and access to personal data, that can be provided by a private user system and computer product. Third, engaging the flexibility, customization, security and access features of such $3^{rd}$ party intermediary system is cumbersome. Fourth, data associated with such $3^{rd}$ party intermediary systems such as contact data needs be replicated from the user's personal server to the $3^{rd}$ party systems. In most prior art systems there are security risks to such replication, as the necessary data transfers generally do not occur on a secure basis, or if security provisions are made, such security provisions may be difficult to guarantee. Fifth, use of such $3^{rd}$ party intermediary systems implies providing access codes to such $3^{rd}$ party. Using such access codes, a rogue would have access to the personal data of the user and could, for example, send a damaging e-mail to the contacts of the user. While such $3^{rd}$ party intermediaries will generally have procedures in place to reduce the likelihood of such an occurrence, such occurrences are possible nonetheless.

Therefore, a system for providing a private communication portal is required that is easy to use and relatively inexpensive. By "private" what is meant is that the communication portal is dedicated to a user rather than multiple users as is the case with $3^{rd}$ part intermediary systems described above.

It should also be understood from the outset that in referring to "private communication portal", the word "communication" is used in accordance with its broad technical definition. In particular, "communication" for the purpose of this document means exchange or accessing of any information, including information formats, using predefined protocols understood by communicating entities. It should be understood that for "communication" to occur, there is no requirement for a human user. "Communication" can in this way be contrasted from "messaging" which is generally understood to relate to communication between more than one human user.

Also, by "portal" what is generally understood is a means for facilitating communication from point A to B. More than one interconnected computer or process may co-operate to provide a single "portal". For example, a first computer or process comprising the "portal" may provide means for locating B at least once. Thereafter, communication between A and B may be facilitated through a second computer or process independent of the first computer or process.

In operation, the present invention provides a private communication portal for remotely managing and accessing messages, as described herein. However, it should be understood that messages are only one form of data that can be communicated in co-operation of the present invention. The invention provided herein provides means for operating private server as a communication server for a variety of purposes, including security monitoring. For example, the communication portal provided for herein could be associated with known security systems that generate data in the form of images of a physical location associated with such security system. The private communication portal described herein provides means for accessing and managing such data remotely, for example, by forwarding images detecting an intruder to an alarm response force.

Providing such a private communication portal system and computer product presents a number of problems. First, the computer on which the private communication portal resides is required to be located on the Internet using a Web browser or WAP device. Second, a system is required that provides a secure Internet connection to said computer of the user. Third, but on a related point, the system needs to authenticate the user and reject unauthorized access. Fourth, messages need be transferred securely between the remote user and said computer.

Thus a system, computer product and method for providing full Internet access to message and contact management functions is desirable, by means of a private communication portal. It is further desirable to provide a system and computer product for providing message and contact management without a $3^{rd}$ party intermediary, by means of a private communication portal.

It should also be noted that $3^{rd}$ party service providers such as Internet Service Providers do not generally allow their users to establish their own dedicated Internet servers, or if they do so it is at a cost that is generally significant. This is because the user's Internet Protocol address generally changes from time to time for system resource management reasons. A dedicated Internet Protocol address can be obtained, but generally only at a premium.

Thus, there is also need for a system, computer product and method for accessing and managing data remotely, even when the Internet Protocol address of a user's computer changes from time to time.

SUMMARY OF THE INVENTION

In accordance with one aspect of the present invention, a system, computer product and method for a private communication portal is provided.

In accordance with another aspect of the present invention, a system, computer product and method for providing full Internet access to and management of data resident on a computer is provided.

In accordance with yet another aspect of the present invention, a system, computer product and method for providing remote access and management of messages and contact information is provided.

In accordance with yet another aspect of the present invention, a system, computer product and method for providing a user with a private server for remote access to data resident on user's computer is provided despite $3^{rd}$ party service provider restrictions that prevent a user from establishing their own Internet server.

The present invention has numerous advantages such as convenient remote access to data such as messages and contact information via any number of electronic devices such as a lap top, cellular phone or WAP-enabled hand held computer etc. In particular, the present invention not only allows messages of all types to be read, but also replied to remotely. The present invention has the added benefit of reducing toll charges generally associated with remote message access.

Another significant benefit of the present invention is the ability to use current e-mail addresses, fax numbers or phone numbers rather than obtain a new one as is generally required by $3^{rd}$ party service providers described above. Transition to a new e-mail address, for example, generally requires the various ordinary recipients of e-mail from a user to update their contact information. This generally results in loss of time in managing the transition (changing contact information, creating pointer from old e-mail addresses) and can potentially result in loss or delay of communications.

In the present invention, the user determines security and access. This provides greater flexibility and greater control of data by allowing, for example, remote forwarding of messages.

Also, in a multi-user system, depending on the number of users accessing the $3^{rd}$ party system at any given time, the performance of the multi-user messaging system can be negatively affected. The invention described herein provides means for ensuring optimal performance of the user's messaging system.

It should also be understood that said $3^{rd}$ party systems generally, for system resource management reasons, set limits to the amount of disk space allocated to each individual user for the purpose of storing data such as messages and contact information. This poses a problem in providing adequate means for archiving such data. Data archiving is either not provided by such $3^{rd}$ party system, in which case such data needs be exported (if permitted by the $3^{rd}$ party system) to the user's system or some other system. This may result in inconvenience and/or time loss. Alternatively, data archiving may be offered by such $3^{rd}$ party system intermediary, but generally at a premium.

More generally, as is readily understood to those skilled in the art, the present invention permits a user's computer to act as a "private server" which can be configured in accordance with the user's requirements.

BRIEF DESCRIPTION OF THE DRAWINGS

A detailed description of the preferred embodiment(s) is(are) provided herein below by way of example only and with reference to the following drawings, in which.

Figure 1:
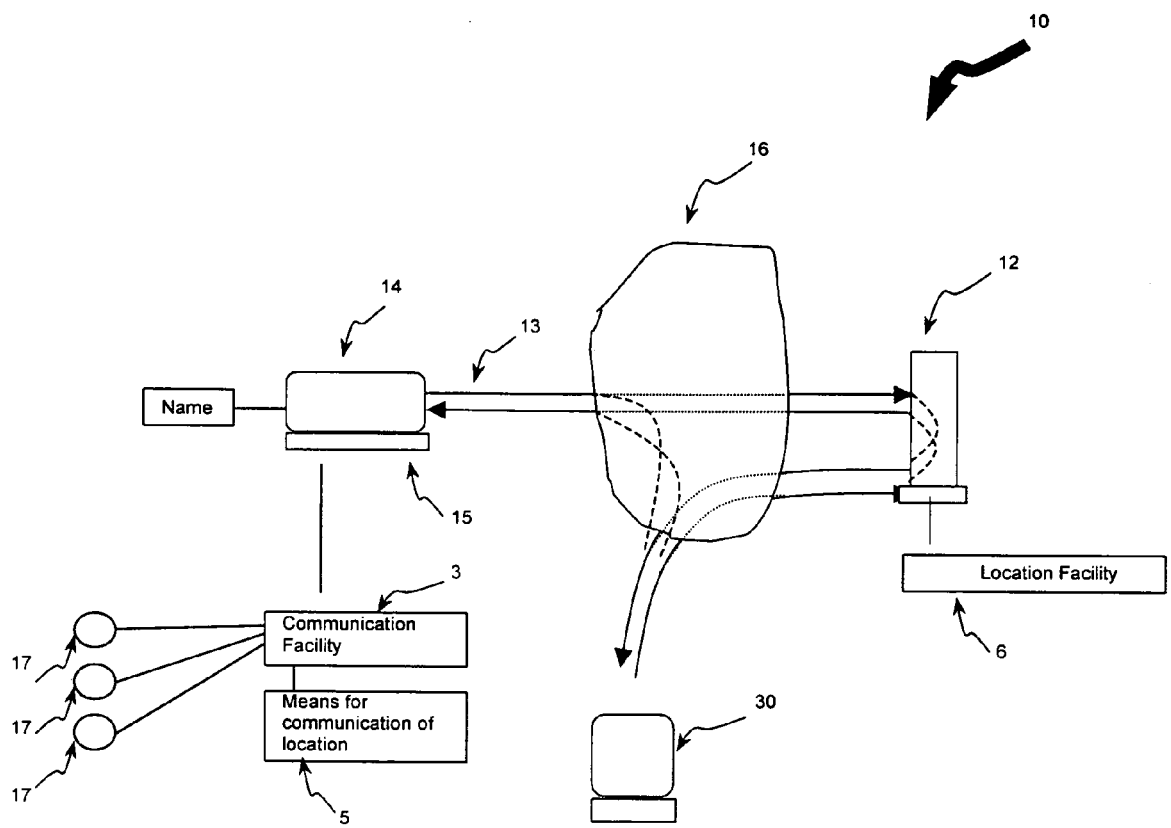
FIG. 1 is a system resource flowchart, in accordance with a preferred embodiment of the present invention.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

Referring to FIG. 1, there is illustrated in a system resource flowchart the preferred embodiment of the present invention illustrated herein. In particular, FIG. 1 illustrates the resources that comprise the private communication portal or "PCP" 10 of the present invention. PCP 10 comprises a dual computer architecture further comprising a first computer or Private Server 14 and server computer or second locator Server Computer 12 It should be understood that Private Server 14 may comprise a network station, personal computer terminal or server, provided that such Private Server 14 is devoted to a private user who may be a business or individual. Said Private Server 14 also comprises a message server 15, as best illustrated in FIG. 1 and a name that identifies the particular private server, as is well known.

Server Computer 12 is connected with unrestricted access to an interconnected network of computers such as the Internet 16. Server Computer 12 may comprise one or more computers, as is well known.

It is desirable to also provide Private Server 14 with a permanent Internet connection 13 provided, for example, by a coaxial cable connection or high speed xDSL telephone connections or the like, also as shown in FIG. 1.

Private Server 14 is provided with a computer program product of the present invention dedicated to Private Server 14 In a first preferred embodiment of the present invention, best illustrated in FIG. 1, this computer product provides a data communication facility 3 and means for communication 5 of the location of Private Server 14 on a computer network such as the Internet to Server Computer 12, as further described below. Said data communication facility 3 can be provided with interfaces with a number of facilities 17 that generate data, in a manner well known to those skilled in the art, such as voice message reception, fax reception, e-mail retrieval, alarm monitoring facilities, child monitoring facilities and the like. As is explained below, te computer program product of the present invention presents means for remotely accessing said data.

In another aspect of the computer program product of the present invention, said Server Computer 12 is provided with a server computer program that communicates with said computer program dedicated to Private Server 14. Said server computer program, illustrated in FIG. 1, provides a Location Facility 6 or means responsive to said means for communication 5 of the location of Private Server 14 for providing remote access to said Private Server 14, as explained below.

Private Messaging and Contact Facility

Figure 4:
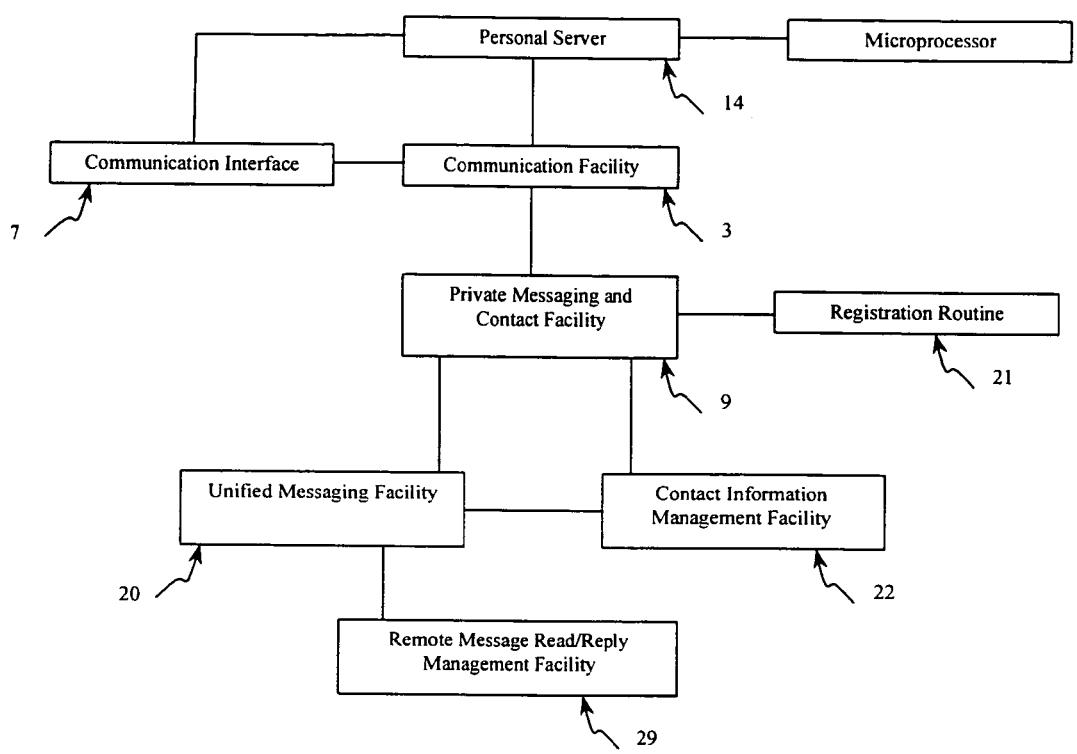
FIG. 4 is a system resource flow chart illustrating the resources of the Private Server of the present invention.

In a second preferred embodiment of the present invention illustrated in FIG. 4, said data communication facility 3 further comprises a communication interface 7 and communication software program 9 or Private Messaging and Contact Facility which are operably associated. Said Private Messaging and Contact Facility 9 comprises two principal elements, namely a Unified Messaging Facility 20 and Contact Information Facility 22.

Figure 5:
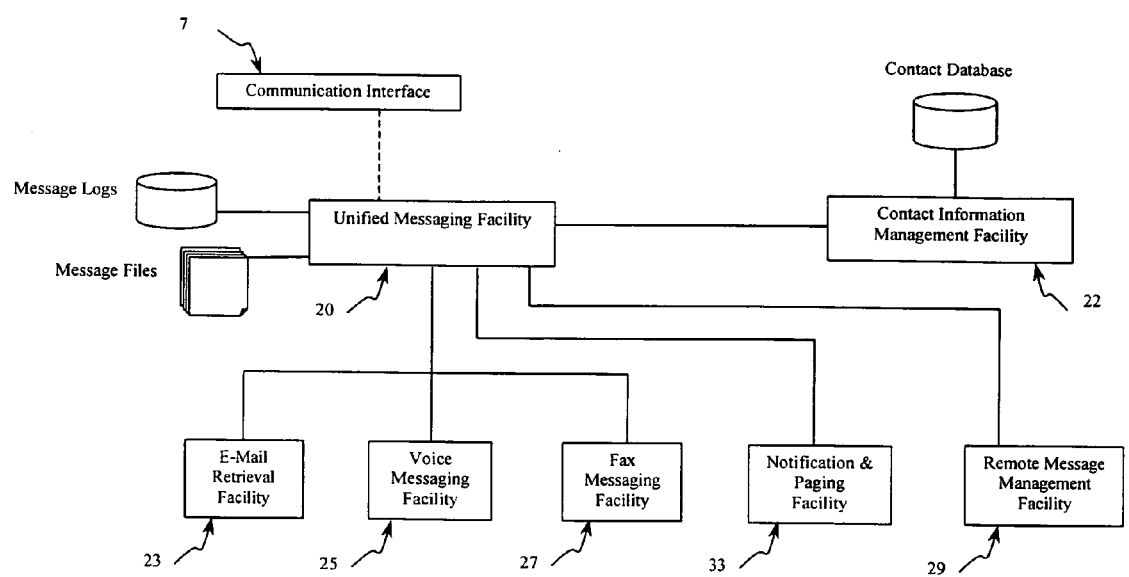
FIG. 5 is a program resource flow chart illustrating the resources of the computer product of the present invention resident on the Private Server.
Figure 6:
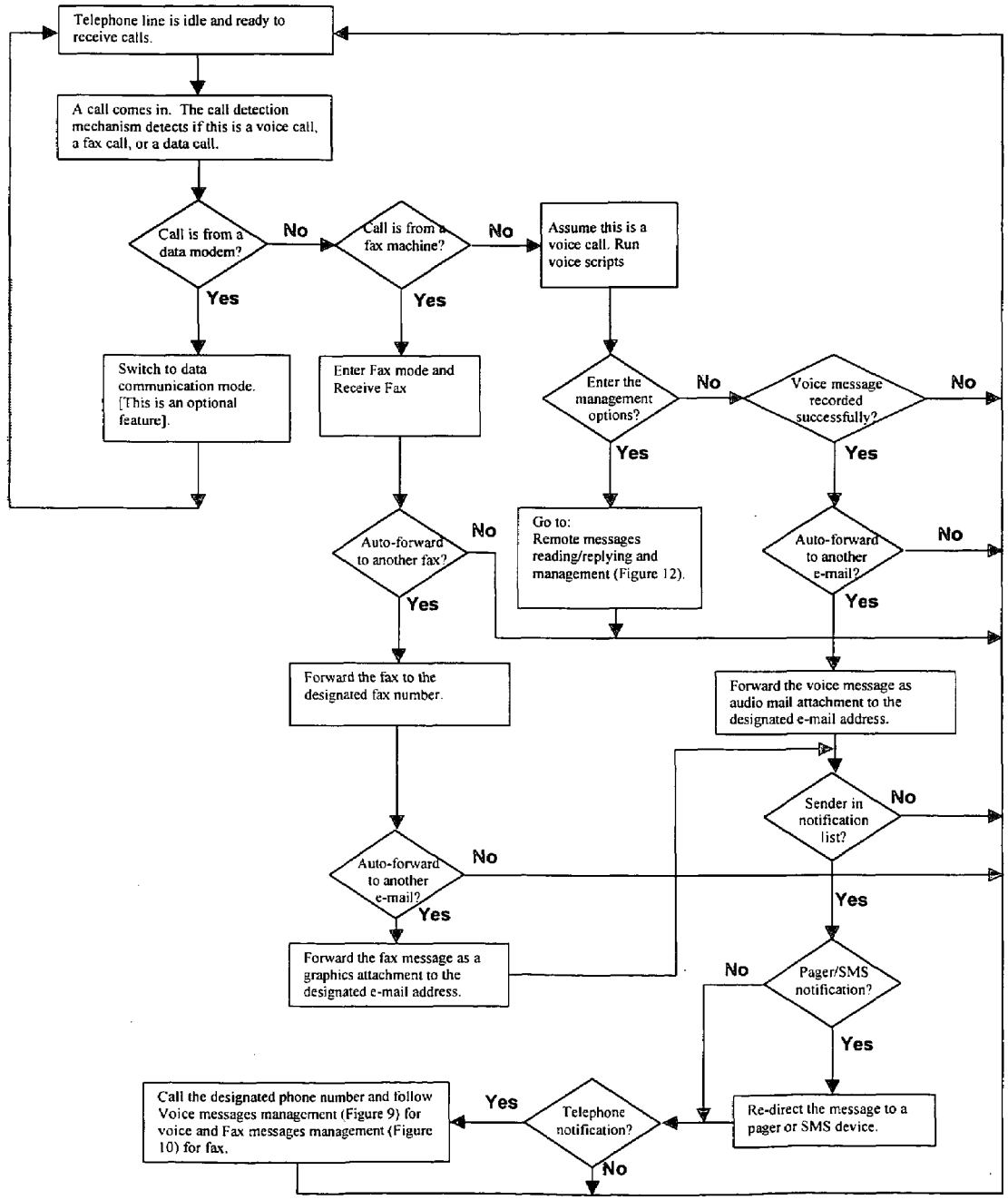
FIG. 6 is a program function chart illustrating the operation of the Fax/Voice/Data Communication Interface of the present invention.
Figure 7:
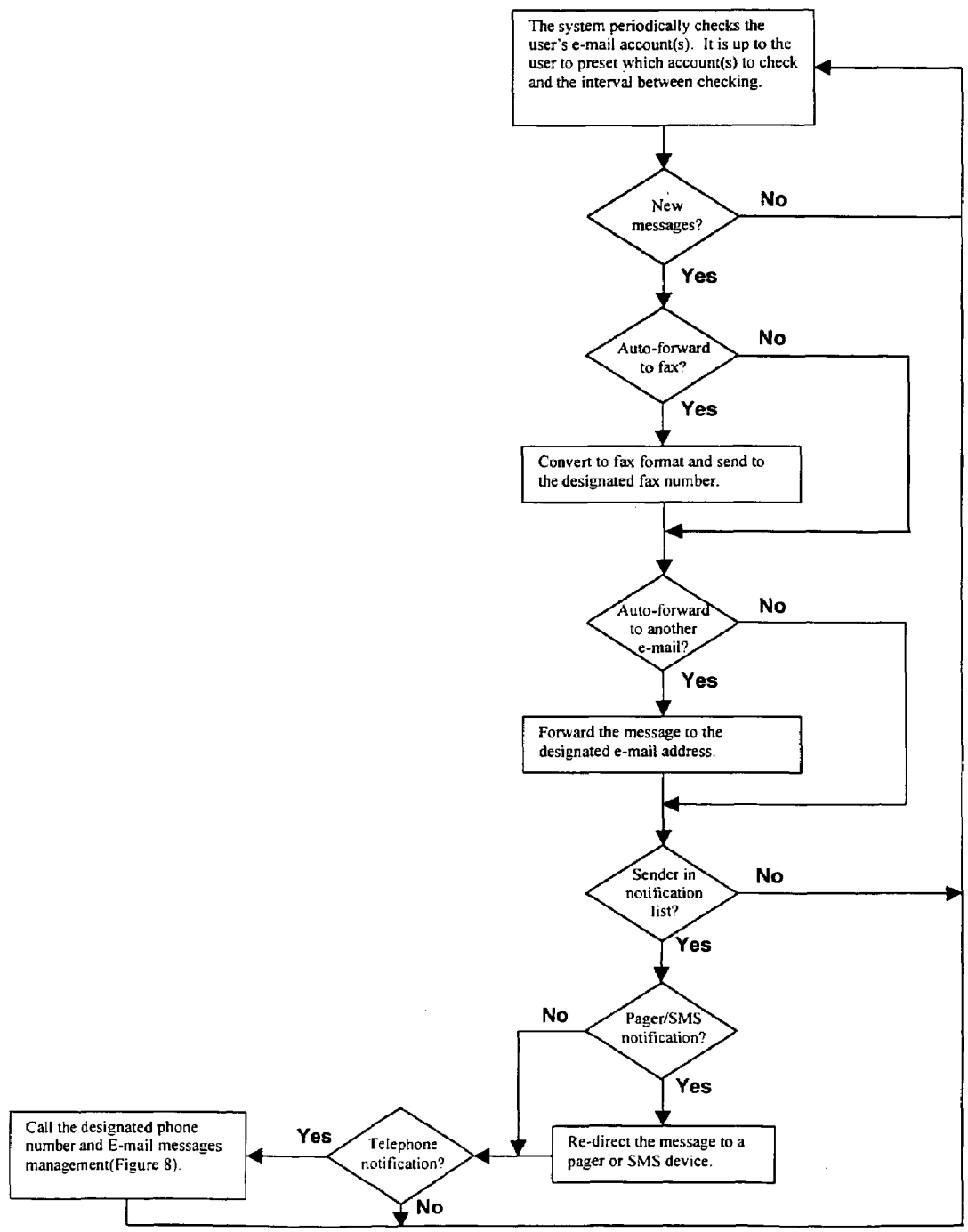
FIG. 7 is a program function chart illustrating the operation of the E-Mail Communication Interface of the present invention.

As best illustrated in FIG. 5, the principal functions of Unified Messaging Facility 20 are to receive and process messages of all types and content, including e-mail, facsimiles, electronic voice mail, images, video data, executable program code, audio data, formatted data or raw binary data. Unified Messaging Facility 20 is operably associated with communication interface 7. The functions of communication interface 7 are illustrated in FIG. 6 for Fax/Voice/Data messages, and in FIG. 7 for e-mail.

Unified Messaging Facility 20 further comprises E-Mail Message Facility 23, Voice Message Facility 25 and Fax Message Facility 27, illustrated in FIGS. 8, 9 and 10 respectively in operation in conjunction with Remote Message Management Facility 28, the functions of which are explained below.

In the present invention, Unified Messaging Facility 20 further comprises Notification Facility 33. This facility is only initiated when a message is received at Private Server 14, in the manner described below in greater detail, from a valid message originator. The hard disk of Private Server 14 will store a copy of a "Notification List" in co-operation with Notification Facility 33. The "Notification List" contains the e-mail addresses, fax identifiers and/or caller identifiers of valid message originators.

Figure 11:
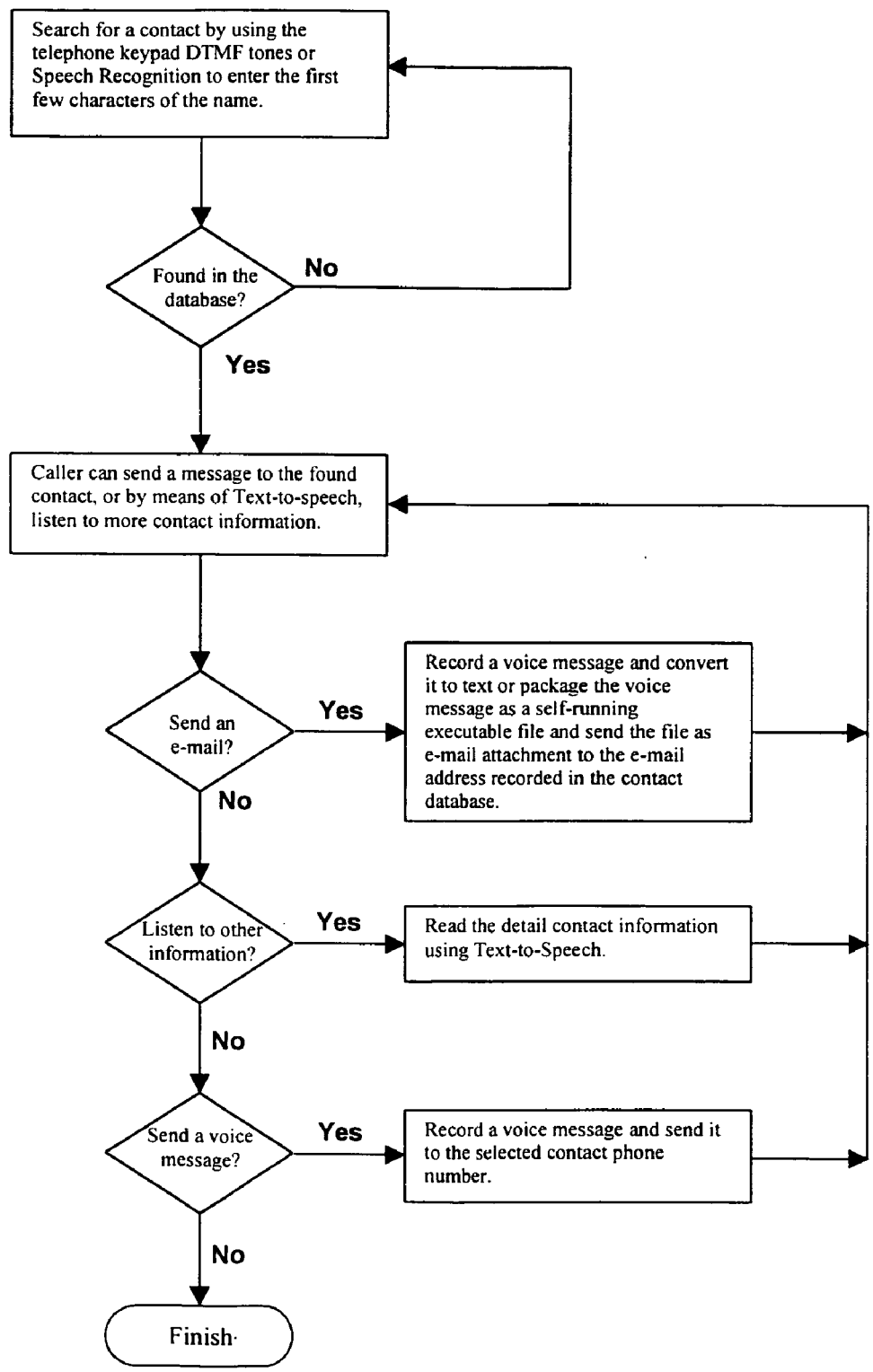
FIG. 11 is a program function chart illustrating the operation of the Contact Information Facility of the present invention.

The principal functions of Contact Information Facility 22 are entering and retrieving contact information such as names, telephone numbers, e-mail addresses, company information, personal information (such as addresses, birthdays and the like), contact history and the like. The principal functions of the Contact Information Facility 22 are illustrated in FIG. 11. These functions, in co-operation with the system of the present invention, are accessible remotely as illustrated in FIG. 11.

Figure 12:
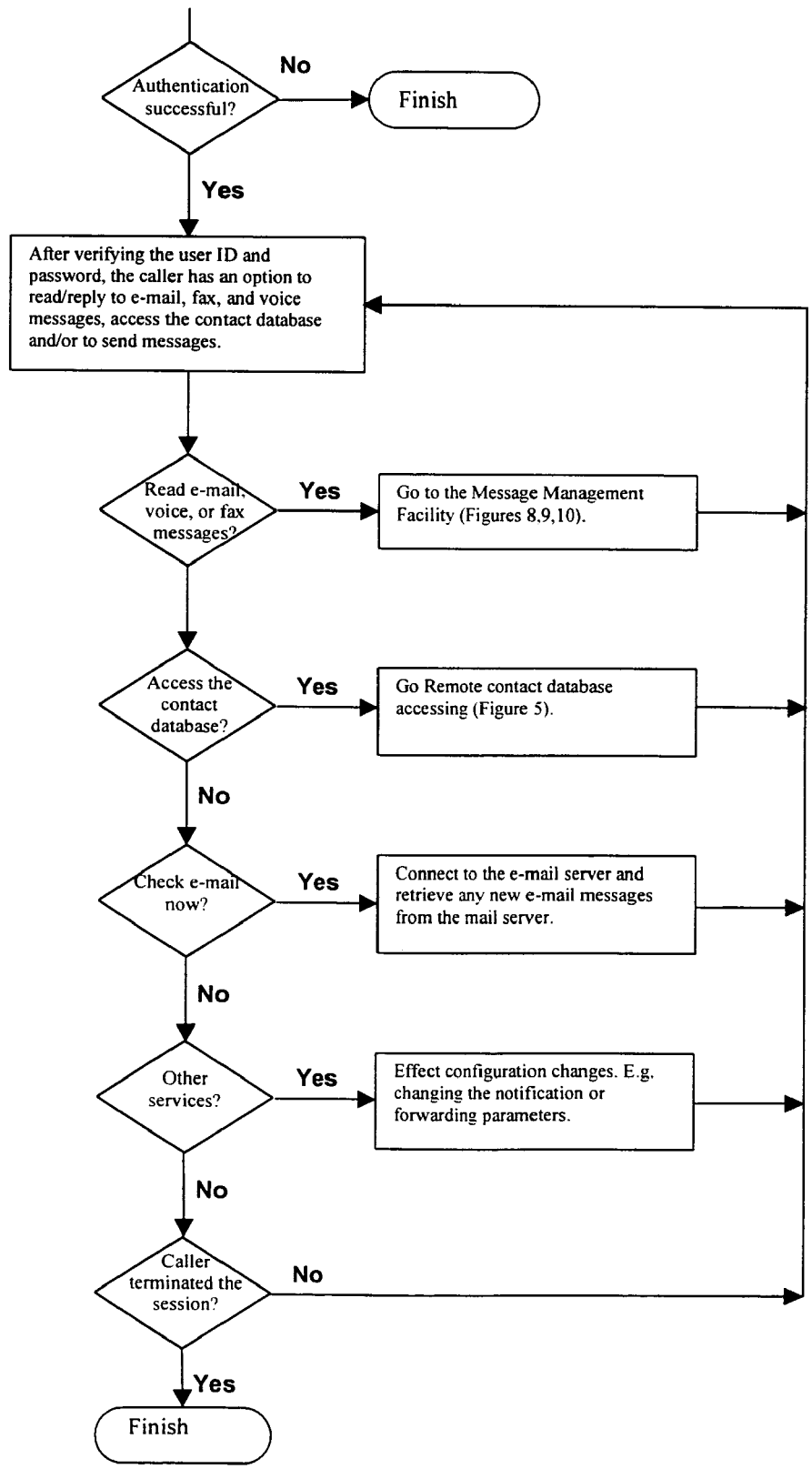
FIG. 12 is a program function chart illustrating the operation of the Remote Message Management Facility of the present invention.

In addition, the Unified Messaging Facility 20 and Contact Information Facility 22, in co-operation with the system of the present invention, also provide the Remote Message Management Facility 29, as best illustrated in FIG. 5. The particular functions of the Remote Message Management Facility 29 are best illustrated in FIG. 12.

Internet Registration and Location

Said Server Computer 12 is configured, in a manner that is well-known, to be connected to the a network of interconnected computers such as the Internet, and particularly in a manner that accepts Internet requests and translates these requests into a connection between said Server Computer 12 and Private Server 14.

Figure 3:
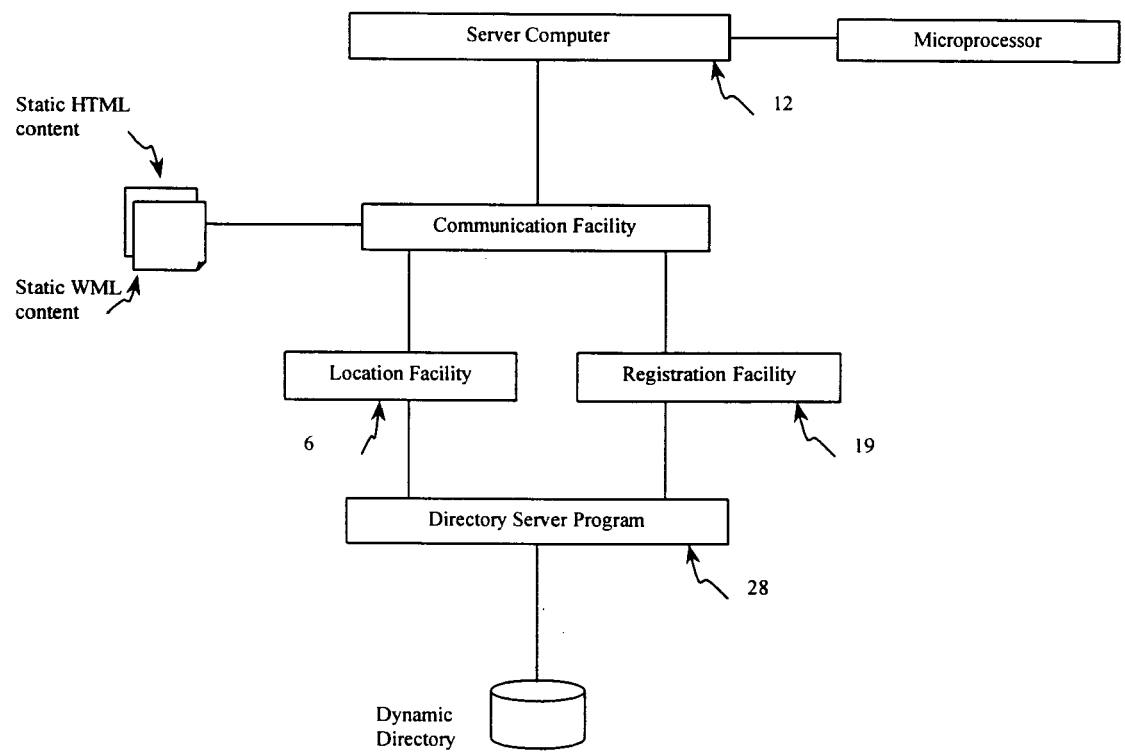
FIG. 3 is a system resource flow chart illustrating the resources of the Server Computer of the present invention.

As best shown in FIG. 3, the system described herein further comprises a directory service program 28. In the particular embodiment illustrated herein, said directory service program 28 is operably associated with Server Computer 12. For the sake of clarity, said directory service program 28 can be either resident on said Server Computer 12 or remote from said Server Computer 12 but accessible therefrom. Directory service program 28 comprises a dynamic directory provided using a protocol such as LDAP (Lightweight Directory Access Protocol) Version 3, with capability for dynamically modifying the directory content of the directory service program 28. It is desirable that only users of the present invention be given access to directory service program 28 by means that are known, such as an authentication routine provided in association with registration facility 19, for example.

Private Messaging and Contact Facility 8 comprises a "REGISTRATION ROUTINE" 21 for indicating that Private Server 14 is available to accept communications such as messages from Server Computer 12. It is desirable for such "REGISTRATION ROUTINE" 21 to be engaged periodically to update the directory service program 28, to address possible changes to the private server's 14 internet protocol address or its communication session with the second computer (the location facility) for a number of reasons. First, it is desirable to verity that the Internet or server connection of Private Server 14 is active Second, when the Private Server 14 is configured to provide the functions of this invention, registration with the Server Computer 12 is obviously required. Third, the "REGISTRATION ROUTINE" 21 is required to be engaged periodically to update the directory service program 28 to address possible changes to Private Server's Internet Protocol address. Fourth, from a system resource management point of view it may be desirable to restrict access to the Server Computer 12 to only active users, in which case users who according to pre-set parameters are determined to be inactive would be automatically de-registered after a period of time. Fifth, some users may wish to change their access codes from time to time. Sixth, some users may want to de-register temporarily with Server Computer 12 in order to interrupt receipt of communications from Server Computer 12, for example, during operation of a back-up routine at Private Computer 14. Seventh, "REGISTRATION ROUTINE" may be required to change security settings provided at Server Computer 12, in a manner that is well-known.

It should be understood that the present invention allows the parameters of the operation of the "REGISTRATION ROUTINE" to be set, in a manner well-known to those skilled in the art, by either the user or the system operator of Server Computer 12, as may be required.

The availability to accept communications such as messages of Private Server 14 is communicated by "REGISTRATION ROUTINE" by registering a name string or digit string with the directory service program 28 that must not conflict with any other similar name in the dynamic directory associated with directory service program 28. This communication includes the current Internet Protocol address of Private Server 14 that as indicated above may change from time to time. The Internet Protocol address of Server Computer 12, however, is fixed and known to the system described herein.

In the manner described above, the current Internet Protocol address of Private Server 14 is provided from time to time and dynamically stored in directory service program 28.

Figure 2:
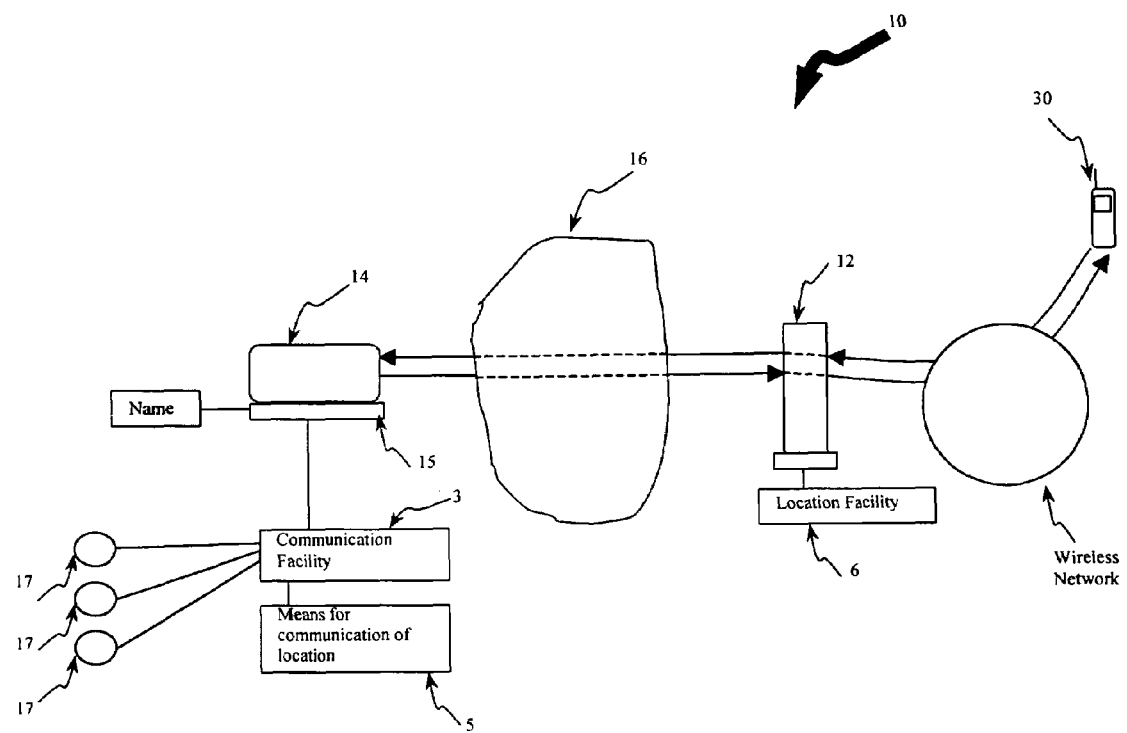
FIG. 2 is a system resource flow chart of the preferred embodiment of the present invention, but illustrating the connection of the system to a wireless network.

When a remote computer or Requesting Device 30 including a remote computer data communication program or facility, such as the Web browser illustrated in FIG. 1, or the Mobile browser illustrated in FIG. 2, requests a connection to Private Server 14, Requesting Device 30 first connects to Server Computer 12 in a manner that is well-known and indicates the name of the Private Server 14 to which Requesting Device 30 wishes to connect.

In particular, in the preferred embodiment of the invention illustrated herein, a request is made by Requesting Device 30 to Server Computer 12 to locate Private Server 12 by means of an entry in a Web Page field or by an HTTP request that already contains the name of Private Server 14.

Server Computer 12 will validate the request to connect to Private Server 14 and initiate a search in the directory associated with the directory service program 28 to obtain the current Internet Protocol address of Private Server 14 and port number of message server 15 of Private Server 14 or the current communication session. Server Computer 12 is thereby engaged to allow a connection to be set up between Requesting Device 30 and Private Server 14.

In the embodiment of the present invention illustrated herein, three connection methods are specifically provided for sake of illustration, as between the Requesting Device 30 and Private Server 14. First a Direct Connection can be provided using a secure web protocol such as "https", in a manner that is well known. In this method, once Server Computer 12 has validated the connection request provided by Requesting Device 30, the Requesting Device 30 is simply forwarded to the Private Server 14, in a manner that is well-known. Thereafter, all interactions will take place directly between the Requesting Device 30 and the Private Server 14 during the communication session.

Second, where the Server Computer 12 has network access to Private Server 14 but Private Server 14 is not accessible from the Internet 16, and may have a network address that is only valid within the network, a Proxy Server (not shown) is used to provide the connection between the Requesting Device 30 and Private Server 14, in a manner that is also well known.

Third, where the Private Server is not accessible from the Internet 16 using the web protocol but from some different protocol such as "H323", the Video Conferencing protocol, protocol conversion is utilized, in a manner that is well known.

The above-described connections provide the means for transferring three kinds of data. First, static page data, namely menus for navigation, which are provided in a manner that is well known to those skilled in the art. Second, lists of information such as message lists which are also provided in a manner that is well known. Third, streamed data, namely message content data such as voice, fax, text and video data which can be displayed in "Real Time" while it is being received. As is well known to those skilled in the art, providing the functions of the Private Messaging and Contact Facility 18 illustrated in FIGS. 5–12 in particular requires access to both kinds of data.

Security

The connection provided by Server Computer 12 between Requesting Device 30 and Private Server 14 can be described as "secure" in accordance with the following security features. First the name of the Private Server 14 is used as the key for locating Private Server on Internet 16. In order to minimize the likelihood of the security of the system of the present invention being compromised, this name should not be derivable from a user of Private Server 14. Second, it is desirable to use a secure communication protocol as between the Requesting Device 30 and Private Server 14, such as the secure "https" web protocol. Third, once a secure connection is established between Requesting Device 30 and Private Server 14, it is desirable to require a further authentication routine without intermediaries. It should be understood that the use of other means of providing secured communication between electronic devices in association with the system described herein are specifically contemplated by the present invention.

Where Requesting Device 30 is a WAP device, it should be understood that authentication and connection to Private Server 14 can happen "automatically". This is because a unique identifier is generally allocated to each WAP device by the manufacturer. As part of the "REGISTRATION ROUTINE" 21 described above, this unique identifier can be associated with the current location of Private Server 14 thus forwarding the WAP device to Private Server 14 automatically.

Full Internet Access

The system provided in this invention allows "full" Internet access to the functions of the Private Messaging and Contact Facility 9 in particular, by operation of the Contact Information Facility 22 and Remote Message Management Facility 29 of the present invention, described above.

This "full" Internet access to data associated with Private Server 14, such as message and contact related data is best understood by illustration of examples in operation.

The user is able to access the list of messages stored on Private Server 14 in association with the computer product of the present invention, and to command Private Server 14 to initiate a connection to receive messages from external message stores (e.g. an Internet Service Provider managing a specific e-mail account).

More importantly, the invention provided herein allows such user to access said list of messages (of any type) stored on Private Server 14 via a Web browser program running on another computer attached to the Internet and command Private Server 14 to initiate a connection to receive messages from external message stores.

The present invention also allows a user to access said list of messages via a telephone call to Server Computer 12 by means of suitable telephony hardware and to command Private Server 14 to initiate a connection to receive messages from said external message stores.

Similarly, the present invention will allow the user to access said list of messages and to command Private Server 14 to initiate a connection for user to receive messages from external message stores via a Mobile Wireless (WAP) device.

On command from the user, the present invention allows individual voice messages to be played; individual e-mail messages, facsimile messages, video and other images to be displayed on a computer, cellular phone (depending on hardware resources) or WAP-enabled hand-held computer; and individual executable message content to be executed on Private Server 14 (for example execution of a sound file and transmission of audio stream to the user).

The present invention also allows the user to reply to a message by means of voice message that is sent as an e-mail attachment when the connection to Private Server 14 is a voice connection. The present invention further allows the user to reply to a message by means of a text message.

By means of Notification Facility 33 in particular, the present invention is able to notify the user of new received messages by means of a telephone call to a Wireless paging service specified by the user. Private Server 14 is also able to notify the user of new received messages by means of a telephone call to a telephone number specified by the user and the subsequent playing of a voice message as a voice data stream. Private Server 14 is further able to notify the user of new received messages by means of a message sent over the Internet to a Wireless paging service specified by the user. Private Server 14 is still further able to provide means for remotely adding, modifying and deleting entries to the Notification List provided by Notification Facility 33 via a Web browser program running on another computer attached to the Internet, voice telephone call to the telephone line attached to Private Server 14 by means of a modem, or Mobile wireless (WAP) device.

Figure 8:
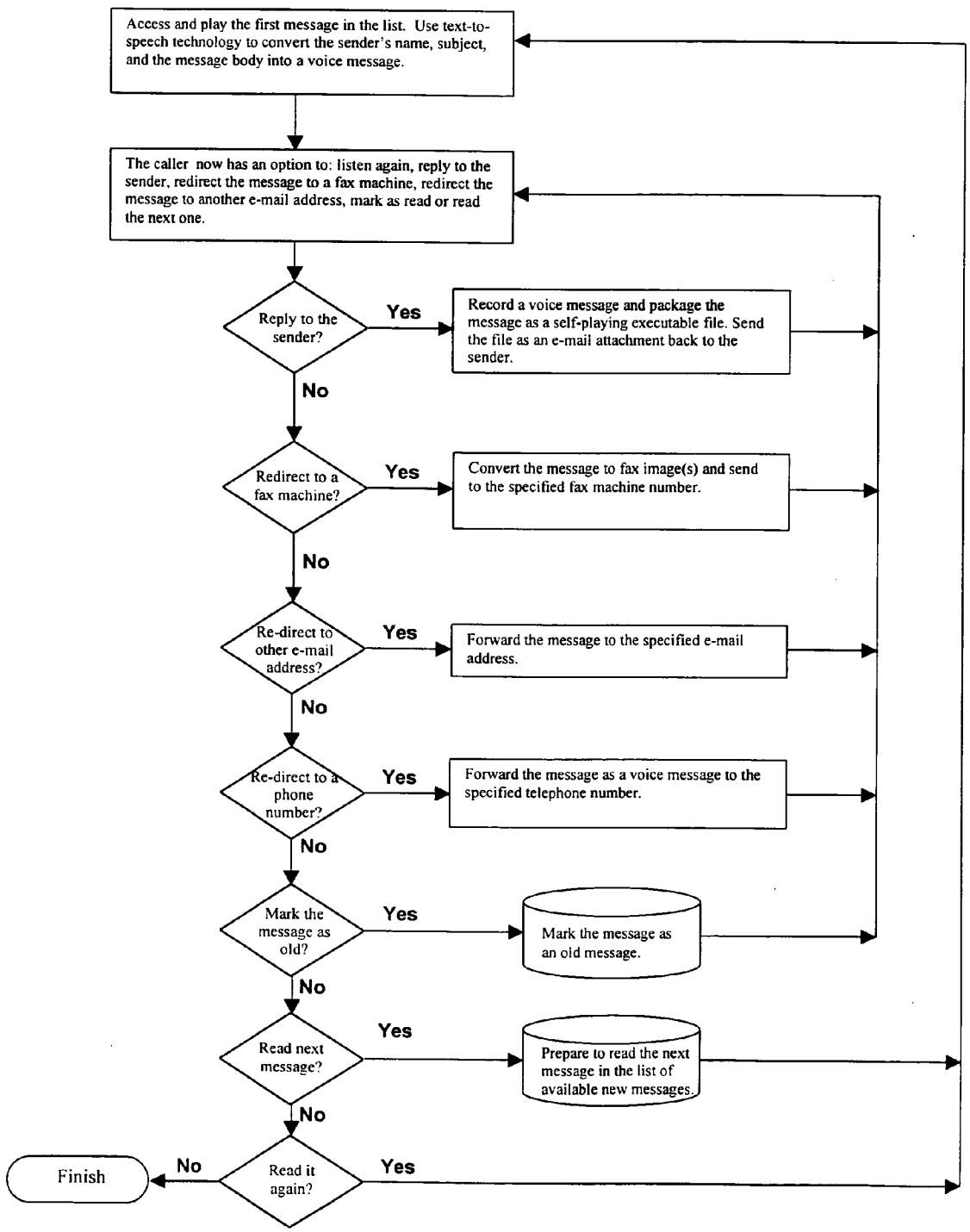
FIG. 8 is a program function chart illustrating the operation of the E-Mail Message Facility of the present invention, in association with the Remote Message Management Facility.
Figure 9:
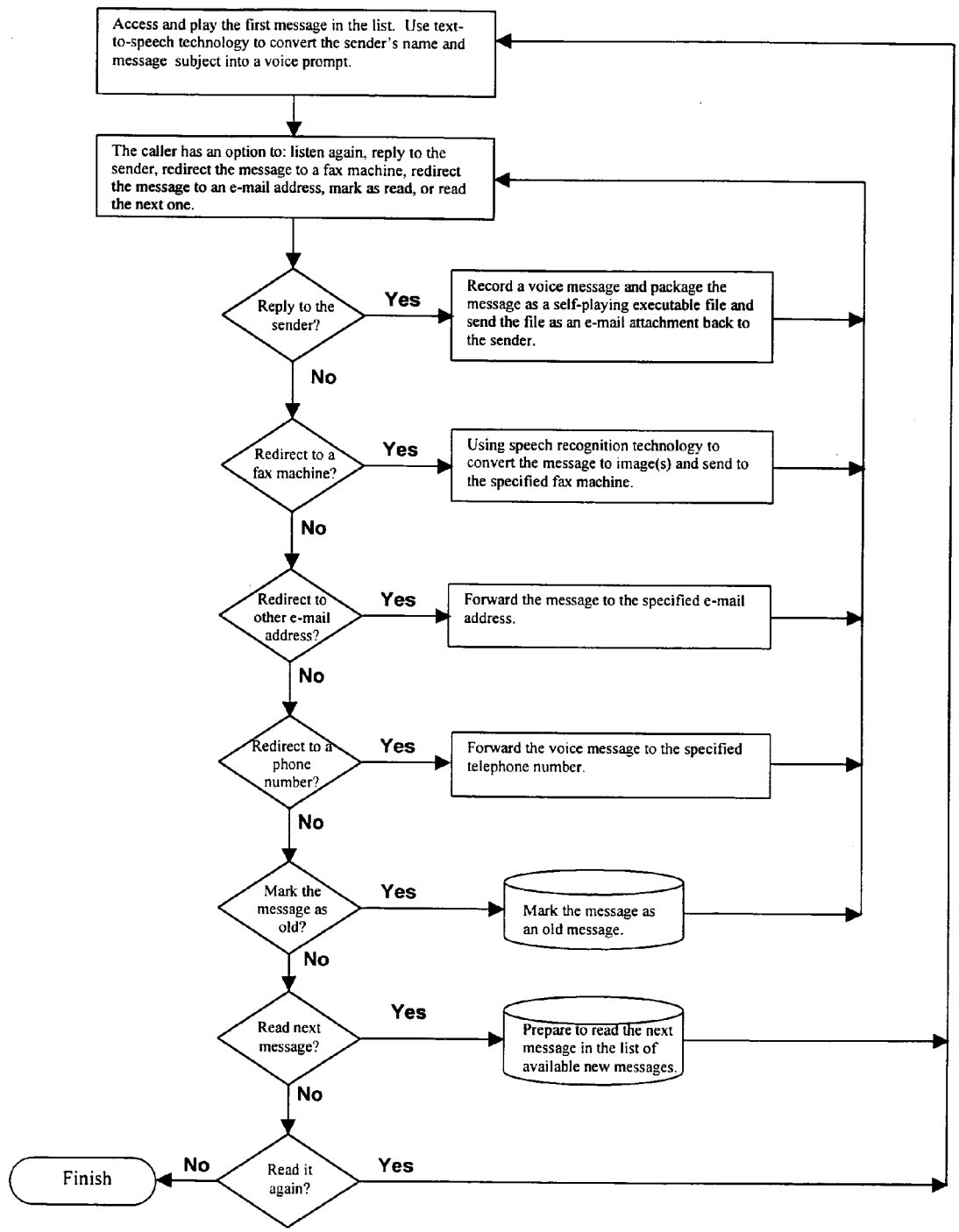
FIG. 9 is a program function chart illustrating the operation of Voice Message Facility of the present invention, in association with the Remote Message Management Facility.
Figure 10:
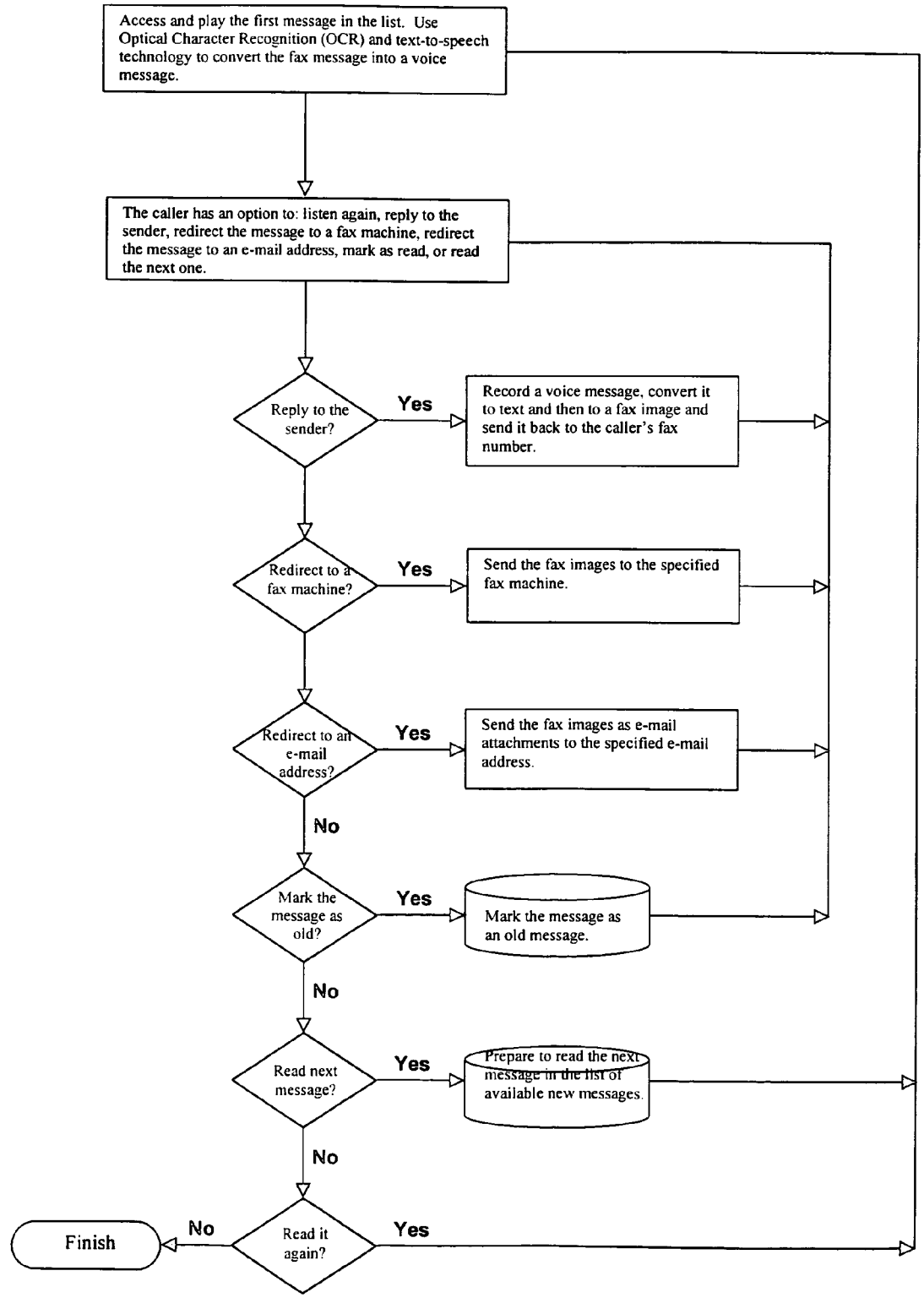
FIG. 10 is a program function chart illustrating the operation of Fax Message Facility of the present invention, in association with the Remote Message Management Facility.

As is illustrated in the Figures, and in particular FIGS. 8, 9 and 10, the computer product of the present invention incorporates text-to-speech technology to provide the full Internet access described herein to a user having a telephone line. This text-to-speech can comprise a variety of commercially available technologies, implemented in a manner that is well known.

The Contact Information Facility 22 of the present invention contributes to providing full Internet access to message and contact management. By means of such facility, the present invention allows the user to access data contained in the contact database on the local computer associated with the Contact Information Facility 22, as illustrated in FIG. 11). More importantly, the present invention also allows the user to access said data on a local computer via a Web browser program running on another computer attached to the Internet and to command Private Server 14 in association with the computer product of the present invention to initiate a connection to receive messages from an external message address. In addition, the present invention allows a user to access said data on a local computer via a telephone call to the telephone line attached to Server Computer 12 by means of a suitable telephony hardware device, or via a Mobile wireless (WAP) device.

Other variations and modifications of the invention are possible. In particular a number of computer program facilities are described in this invention as separate facilities for the sake of describing the invention. However, it should be understood that such facilities can be combined with other facilities comprising the present invention, or such facilities can be sub-divided into separate facilities. It should also be understood that various other features or functions can be added to the present invention without departing from the scope of the present invention such as additional means accessing and managing messages and contact information remotely. In addition, it should be understood that the private communication portal can be associated with any means for generating useful data and managing such data where it is desirable to provide remote access to such data. In addition, it is contemplated that various means for restricting access to the private communication portal of the present invention other than to authorized users be utilized. It should also be understood that the Private Server of the present invention may comprise more than one copy of the computer product of the present invention. Various means for creating network connections are illustrated herein, however, other means for creating such connections used in conjunction with the invention described are also within the scope of the present invention. All such modifications or variations are believed to be within the sphere and scope of the invention as defined by the claims appended hereto.

We claim:

1. A system for providing access to a personal computer having a location on the Internet defined by a dynamic IP address from a remote computer, the system comprising:

(a) a personal computer linked to the Internet, its location on the Internet being defined by either (i) a dynamic public IP address (publicly addressable), or (ii) a dynamic LAN IP address (publicly un-addressable), the personal computer being further linked to a data communication facility, the data communication facility being adapted to create and send a communication that includes a then current dynamic public IP address (publicly addressable) or dynamic LAN IP address (publicly un-addressable) of the personal computer;

(b) a locator server computer linked to the Internet, its location on the Internet being defined by a static IP address, and including a location facility for locating the personal computer; and (c) a remote computer linked to the Internet, the remote computer including a communication facility, the communication facility being operable to create a request for communication with the personal computer, and send the request for communication to the locator server computer;

wherein the data communication facility includes data corresponding to the static IP address of the locator server computer, thereby enabling the data communication facility to create and send on an intermittent basis one or more communications to the locator server computer that include the then current dynamic public IP address or dynamic LAN IP address of the personal computer; and wherein the locator server computer is operable to act as an intermediary between the personal computer and the remote computer by creating one or more communication sessions there between, said one or more communication sessions being created by the location facility, in response to receipt of the request for communication with the personal computer from the remote computer, by determining the then current location of the personal computer and creating a communication channel between the remote computer and the personal computer, the location facility being operable to create such communication channel whether the personal computer is linked to the Internet directly (with a publicly addressable) dynamic IP address or indirectly via an Internet gateway/proxy (with a publicly un-addressable dynamic LAN IP address).

2. The system as claimed in claim 1, wherein the first computer is linked to the Internet directly or via an Internet gateway/proxy.

3. A system as claimed in claim 1, wherein the personal computer is linked to a database, and said system provides means for remotely accessing said database from the remote computer.

4. A system as claimed in claim 3, wherein said system enables communication settings associated with the data communication facility to be set remotely for the personal computer from the remote computer.

5. A system as claimed in claim 1, wherein said location facility enables the current location of the personal computer to be known to the locator server computer.

6. A system as claimed in claim 5, wherein the location facility includes a dynamic location directory, wherein said dynamic location directory is responsive to the communication from the personal computer, including data for locating and/or communicating with the personal computer, to dynamically store such data to a server database linked to the locator server computer.

7. A system as claimed in claim 6, wherein the location facility is responsive to the request from the remote computer for communication with the personal computer to retrieve the current location and port number or the current communication session associated with the personal computer from the dynamic location directory, and provide said current location and port number, or the current communication session, to the personal computer.

8. A system as claimed in claim 6, wherein said data communication facility creates and sends the communication including the current location or the current communication session of the personal computer to the locator server computer periodically.

9. A system as claimed in claim 8, wherein said system further includes a security facility for restricting access to the locator server computer to one or more authorized users only.

10. A system as claimed claim 9, wherein said data communication facility further includes a communication interface for sending and receiving data communications.

11. A system as claimed in claim 1, wherein said data communication facility interfaces with data generating facilities linked to the database and the personal computer, so as to provide remote access to data created by the data generating facilities from the remote computer.

12. A system as claimed in claim 1, wherein said data communication facility further includes a private messaging and contact facility linked to the database for processing and managing messages and contact data in co-operation with said communication interface.

13. A system as claimed in claim 12, wherein said private messaging and contact facility includes a unified messaging facility and a contact information facility, each being linked to the database.

14. A system as claimed in claim 13, wherein said unified messaging facility enables the remote management of messages linked to the database and the personal computer from the remote computer.

15. A system as claimed in claim 14, wherein said unified messaging facility enables reading, replying and managing said messages linked to the personal computer remotely from the remote computer.

16. A system as claimed in claim 15, wherein said messages include e-mails, facsimiles and/or voice mails.

17. A system as claimed in claim 16, wherein said unified messaging facility includes an e-mail message facility.

18. A system as claimed in claim 17, wherein said unified messaging facility further includes a fax message management facility.

19. A system as claimed in claim 18, wherein said unified messaging facility further includes a voice message facility.

20. A system for providing access to a personal computer from a remote computer, the personal computer being linked to the Internet, the location of the personal computer on the Internet being defined by either (i) a dynamic public IP address (publicly addressable), or (ii) a dynamic LAN IP address (publicly un-addressable), the personal computer being further linked to a data communication facility, the data communication facility being adapted to create and send a communication that includes a then current dynamic public IP address (publicly addressable) or dynamic LAN IP address (publicly un-addressable) of the personal computer, the system comprising:

(a) a locator server computer linked to the Internet, its location on the Internet being defined by a static IP address, and including a location facility for locating the personal computer;

wherein the remote computer is also linked to the Internet, the remote computer including a communication facility, the communication facility being adapted to create a request for communication with the personal computer, and send the request for communication to the locator server computer;

wherein, the data communication facility is operable to access data corresponding to the static IP address of the locator server computer, thereby enabling the data communication facility to create and send on an intermittent basis one or more communications to the locator server computer that include the then current dynamic public IP address or dynamic LAN IP address of the personal computer; and wherein the locator server computer is operable to act as an intermediary between the personal computer and the remote computer by creating one or more communication sessions there between, said one or more communication sessions being created by the location facility, in response to receipt of the request for communication with the personal computer from the remote computer, by determining the then current location of the personal computer and creating a communication channel between the remote computer and the personal computer, the location facility being operable to create such communication channel whether the personal computer is linked to the Internet directly with a (publicly addressable) dynamic IP address or indirectly via an Internet gateway/proxy (with a publicly un-addressable dynamic LAN IP address).

21. A method of providing access to a personal from a remote computer, the personal computer being linked to the Internet, its location on the Internet being defined by either (i) a dynamic public IP address (publicly addressable), or (ii) a dynamic LAN IP address (publicly un-addressable), the method comprising the steps of:

(a) providing a data communication facility on the personal computer, the data communication facility being adapted to create and send a communication that includes a then current dynamic public IP address (publicly addressable) or dynamic LAN IP address (publicly un-addressable) of the personal computer;

(b) by operation of the data communication facility:
  (i) obtaining the static IP address for a locator server computer, that includes a location facility for locating the personal computer;
  (ii) sending the communication that includes the then current dynamic public IP address (publicly addressable) or dynamic LAN IP address (publicly un-addressable) of the personal computer to the locator server computer;

(c) receiving a request from the remote computer at the locator server computer to communicate with the personal computer;

(d) in response to the request, the locator server computer acting as an intermediary between the personal computer and the remote computer by creating one or more communication sessions there between, said one or more communication sessions being created by the location facility, in response to receipt of the request for communication with the personal computer from the remote computer, by determining the then current location of the personal computer and creating a communication channel between the remote computer and the personal computer, the location facility being operable to create such communication channel whether the personal computer is linked to the Internet directly with a (publicly addressable) dynamic IP address or indirectly via an Internet gateway/proxy (with a publicly un-addressable dynamic LAN IP address).

22. The method claimed in claim 21, further comprising the step of the locator server computer storing the current location of the personal computer into a directory linked to the location facility, the current location being obtained from a communication sent by the personal computer to the locator server computer.

23. A computer readable memory having recorded thereon statements and instructions for execution by a computer to carry out the method of claim 21.

24. A computer program product for use on a server computer linked to the Internet and having a static IP address, for providing access to a personal computer from a remote computer, the personal computer being linked to the Internet, its location on the Internet being defined by either (i) a dynamic public IP address (publicly addressable), or (ii) a dynamic LAN IP address (publicly un-addressable), the computer program product comprising:

(a) a computer usable medium;
(b) computer readable program code recorded or storable in the computer useable medium, the computer readable program code defining a server computer program on the server computer wherein:
  (i) the server computer program is operable to enable a connection between the remote computer and the server computer; and
  (ii) the server computer program includes a location facility and is responsive to a request from the remote computer to communicate with the personal computer to act as an intermediary between the personal computer and the remote computer by creating one or more communication sessions there between, said one or more communication sessions being created by the location facility, in response to receipt of the request for communication with the personal computer from the remote computer, by determining a then current location of the personal computer and creating a communication channel between the remote computer and the personal computer, the location facility being operable to create such communication channel whether the personal computer is linked to the Internet directly (with a publicly addressable) dynamic IP address or indirectly via an Internet gateway/proxy (with % publicly un-addressable dynamic LAN IP address).

25. The computer program product claimed in claim 24, wherein the location facility is responsive to a communication from the personal computer including its current location to store the current location to a storage medium linked to the server computer.

26. A computer program product for use on a personal computer for providing access to the personal computer from a remote computer, the personal computer being linked to the Internet, its location on the Internet being defined by either (i) a dynamic public IP address (publicly addressable), or (ii) a dynamic LAN IP address (publicly un-addressable), the computer program product comprising:

(a) a computer usable medium;
(b) computer readable program code recorded or storable in the computer useable medium, the computer readable program code defining a data communication program on the personal computer wherein:
  (i) the data communication program is operable to send a communication to a locator server computer, wherein the locator server computer is linked to a location facility and includes data for locating the personal computer; and
  (ii) the data communication program is operable to communicate with the remote computer, the locator server computer acting as an intermediary between the personal computer and the remote computer by creating one or more communication sessions there between, said one or more communication sessions being created by the location facility, in response to receipt of a request for communication with the personal computer from the remote computer, by determining a then current location of the personal computer and creating a communication channel between the remote computer and the personal computer, the location facility being operable to create such communication channel whether the personal computer is linked to the Internet directly (with a publicly addressable) dynamic IP address or indirectly via an Internet gateway/proxy (with a publicly un-addressable dynamic LAN IP address).

27. The computer program product as claimed in claim 26, wherein the personal computer is linked to the Internet directly or indirectly via an Internet gateway/proxy.

28. A computer program product as claimed in claim 27, wherein the personal computer is linked to a database linked to the data communication program, and said system provides means for remotely accessing said database linked to the personal computer from the remote computer.

29. A computer program product as claimed in claim 28, wherein said data communication program enables communication settings associated with the data communication program to be set remotely from the remote computer for the personal computer.

30. A computer program product as claimed in claim 29, wherein said data communication program enables the current location of the personal computer to be known to the locator server computer.

31. A computer program product as claimed in claim 30, wherein said data communication program creates and sends the communication including the current location or the current communication session of the personal computer to the locator server computer periodically.

32. A computer program product as claimed claim 31, wherein said data communication program further includes, or is linked to, a communication interface for sending and receiving data communications.

33. A computer program product as claimed in claim 32, wherein said data communication program interfaces with data generating facilities linked to the database, so as to provide remote access to data created by the data generating facilities linked to the personal computer from the remote computer.

34. A computer program product as claimed in claim 33, wherein said data communication program further includes a private messaging and contact facility linked to the database for processing and managing messages and contact data in co-operation with said communication interface.

35. A computer program product as claimed in claim 34, wherein said private messaging and contact facility includes a unified messaging facility and a contact information facility, each being linked to the database.

36. A computer program product as claimed in claim 35, wherein said data communication program further includes, or is linked to, a remote message management facility linked to the database.

37. A computer program product as claimed in claim 36, wherein said unified messaging facility enables reading, replying and managing said messages linked to the personal computer remotely from the remote computer.

38. A computer program product as claimed in claim 37, wherein said messages include e-mails, facsimiles and/or voice mails.

39. A computer program product as claimed in claim 38, wherein said unified messaging facility includes an e-mail message facility.

40. A computer program product as claimed in claim 39, wherein said unified messaging facility further includes a fax message management facility.

41. A computer program product as claimed in claim 40, wherein said unified messaging facility further includes a voice message facility.

42. The system claimed in claim 1, wherein once the communication channel is created between the remote computer and the personal computer, the personal computer is operable to receive and act on commands from the remote computer for remote control and/or remote access of the personal computer from the remote computer.

43. The system as claimed in claim 20, wherein once the communication channel is created between the remote computer and the personal computer, the personal computer is operable to receive and act on commands from the remote computer for remote control and/or remote access of the personal computer from the remote computer.

44. The method claimed in claim 21, further comprising the step of the personal computer receiving and acting on commands from the remote computer for remote control and/or remote access of the personal computer from the remote computer.

45. The computer program product claimed in claim 24, wherein by operation of the location facility the personal computer is operable to receive and act on commands from the remote computer for remote control and/or remote access of the personal computer from the remote computer.

46. The computer program product claimed in claim 45, wherein by operation of the location facility the personal computer is operable to receive commands from the remote computer for remote control and/or remote access of the personal computer from the remote computer.

* * * * *

UNITED STATES PATENT AND TRADEMARK OFFICE
CERTIFICATE OF CORRECTION

| | | |
|---|---|---|
| PATENT NO. | : 6,928,479 B1 | Page 1 of 1 |
| APPLICATION NO. | : 09/595533 | |
| DATED | : August 9, 2005 | |
| INVENTOR(S) | : Steven P. Meyer, Pedro P. Nasciment and Andrew Cheung | |

It is certified that error appears in the above-identified patent and that said Letters Patent is hereby corrected as shown below:

Column 14, line 14, "%" should be changed to --a--.

Signed and Sealed this

Thirtieth Day of September, 2008

JON W. DUDAS
*Director of the United States Patent and Trademark Office*

(12) INTER PARTES REEXAMINATION CERTIFICATE (1110th)
United States Patent
Meyer et al.

(10) Number: US 6,928,479 C1
(45) Certificate Issued: May 18, 2015

(54) SYSTEM COMPUTER PRODUCT AND METHOD FOR PROVIDING A PRIVATE COMMUNICATION PORTAL

(75) Inventors: Steven P. Meyer, Thornhill (CA); Pedro P. Nascimento, Mississauga (CA); Andrew Cheung, Mississauga (CA)

(73) Assignee: 01 COMMUNIQUE LABORATORY INC., Mississauga, Ontario (CA)

Reexamination Request:
No. 95/001,018, Dec. 7, 2007

Reexamination Certificate for:
Patent No.: 6,928,479
Issued: Aug. 9, 2005
Appl. No.: 09/595,533
Filed: Jun. 16, 2000

(51) Int. Cl.
*H04L 29/06* (2006.01)
*H04W 12/06* (2009.01)
*H04W 88/02* (2009.01)
*H04W 64/00* (2009.01)
*H04W 74/00* (2009.01)

(52) U.S. Cl.
CPC ............... *H04L 63/08* (2013.01); *H04W 88/02* (2013.01); *H04W 12/06* (2013.01); *H04W 64/00* (2013.01); *H04W 74/00* (2013.01)

(58) Field of Classification Search
USPC ......................................................... 370/401
See application file for complete search history.

(56) References Cited

To view the complete listing of prior art documents cited during the proceeding for Reexamination Control Number 95/001,018, please refer to the USPTO's public Patent Application Information Retrieval (PAIR) system under the Display References tab.

*Primary Examiner* — Christopher E Lee

(57) ABSTRACT

A system, computer product and method for providing a private communication portal at a first computer connected to a network of computers includes a communication facility resident at the first computer, and a second computer including a locating facility for locating the current location of the first computer on the network, where the second computer facilitates communication between the first computer and a third computer by authenticating the third computer for communication with the first computer and providing the location of the first computer for communication with the third computer.

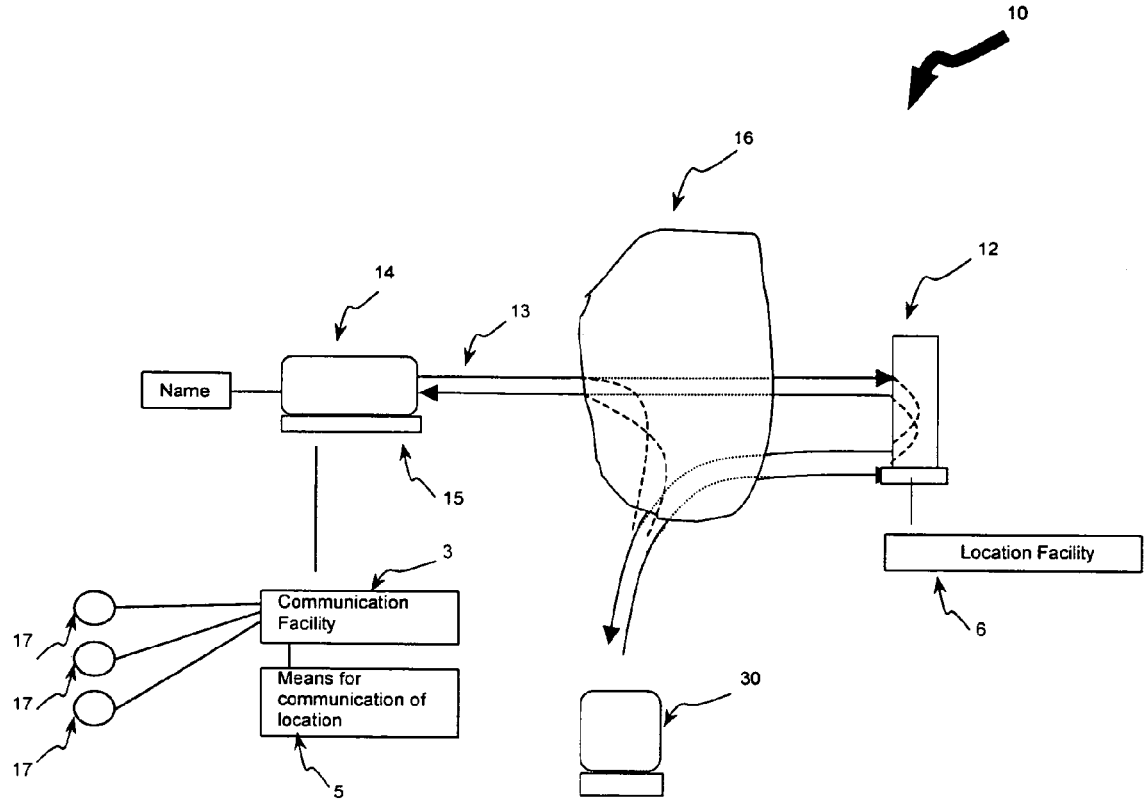

US 6,928,479 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-6, 20-30 and 42-45 is confirmed.

Claims 7, 8, 11, 31 and 46 are determined to be patentable as amended.

Claims 9, 10, 32 and 33, dependent on an amended claim, are determined to be patentable.

Claims 12-19 and 34-41 were not reexamined.

7. [A system as claimed in claim 6,] *A system for providing access to a personal computer having a location on the Internet defined by a dynamic IP address from a remote computer, the system comprising:*
  (a) *a personal computer linked to the Internet, its location on the Internet being defined by either*
    (i) *a dynamic public IP address (publicly addressable), or*
    (ii) *a dynamic LAN IP address (publicly un-addressable), the personal computer being further linked to a data communication facility, the data communication facility being adapted to create and send a communication that includes a then current dynamic public IP address (publicly addressable) or dynamic LAN IP address (publicly un-addressable) of the personal computer;*
  (b) *a locator server computer linked to the Internet, its location on the Internet being defined by a static IP address, and including a location facility for locating the personal computer; and*
  (c) *a remote computer linked to the Internet, the remote computer including a communication facility, the communication facility being operable to create a request for communication with the personal computer, and send the request for communication to the locator server computer;*
  *wherein the data communication facility includes data corresponding to the static IP address of the locator server computer, thereby enabling the data communication facility to create and send on an intermittent basis one or more communications to the locator server computer that include the then current dynamic public IP address or dynamic LAN IP address of the personal computer; and*
  *wherein the locator server computer is operable to act as an intermediary between the personal computer and the remote computer by creating one or more communication sessions there between, said one or more communication sessions being created by the location facility, in response to receipt of the request for communication with the personal computer from the remote computer, by determining the then current location of the personal computer and creating a communication channel between the remote computer and the personal computer, the location facility being operable to create such communication channel whether the personal computer is linked to the Internet directly (with a publicly addressable) dynamic IP address or indirectly via an Internet gateway/proxy (with a publicly un-addressable dynamic LAN IP address);*
  *wherein said location facility enables the current location of the personal computer to be known to the locator server computer;*
  *wherein the location facility includes a dynamic location directory, wherein said dynamic location directory is responsive to the communication from the personal computer, including data for locating and/or communicating with the personal computer, to dynamically store such data to a server database linked to the locator server computer; and*
  *wherein the location facility is responsive to the request from the remote computer for communication with the personal computer to retrieve the current location and port number or the current communication session associated with the personal computer from the dynamic location directory, and provide said current location and port number, or the current communication session, to the personal computer.*

8. [A system as claimed in claim 6,] *A system for providing access to a personal computer having a location on the Internet defined by a dynamic IP address from a remote computer, the system comprising:*
  (a) *a personal computer linked to the Internet, its location on the Internet being defined by either*
    (i) *a dynamic public IP address (publicly addressable), or*
    (ii) *a dynamic LAN IP address (publicly un-addressable), the personal computer being further linked to a data communication facility, the data communication facility being adapted to create and send a communication that includes a then current dynamic public IP address (publicly addressable) or dynamic LAN IP address (publicly un-addressable) of the personal computer;*
  (b) *a locator server computer linked to the Internet, its location on the Internet being defined by a static IP address, and including a location facility for locating the personal computer; and*
  (c) *a remote computer linked to the Internet, the remote computer including a communication facility, the communication facility being operable to create a request for communication with the personal computer, and send the request for communication to the locator server computer;*
  *wherein the data communication facility includes data corresponding to the static IP address of the locator server computer, thereby enabling the data communication facility to create and send on an intermittent basis one or more communications to the locator server computer that include the then current dynamic public IP address or dynamic LAN IP address of the personal computer; and*
  *wherein the locator server computer is operable to act as an intermediary between the personal computer and the remote computer by creating one or more communication sessions there between, said one or more communication sessions being created by the location facility, in response to receipt of the request for communication with the personal computer from the remote computer, by determining the then current location of the personal* computer and creating a communication channel between the remote computer and the personal computer, the location facility being operable to create such communication channel whether the personal computer is linked to the Internet directly (with a publicly addressable) dynamic IP address or indirectly via an Internet gateway/proxy (with a publicly un-addressable dynamic LAN IP address);

wherein said location facility enables the current location of the personal computer to be known to the locator server computer;

wherein the location facility includes a dynamic location directory, wherein said dynamic location directory is responsive to the communication from the personal computer, including data for locating and/or communicating with the personal computer, to dynamically store such data to a server database linked to the locator server computer; and wherein said data communication facility creates and sends the communication including the current location or the current communication session of the personal computer to the locator server computer periodically.

11. A system as claimed in claim 1, wherein said data communication facility interfaces with data generating facilities linked to [the] *a* database and the personal computer, so as to provide remote access to data created by the data generating facilities from the remote computer.

31. [A computer program product as claimed in claim 30,] *A computer program product for use on a personal computer for providing access to the personal computer from a remote computer, the personal computer being linked to the Internet, its location on the Internet being defined by either (i) a dynamic public IP address (publicly addressable), or (ii) a dynamic LAN IP address (publicly un-addressable), the computer program product comprising:*

(a) *a computer usable medium;*

(b) *computer readable program code recorded or storable in the computer useable medium, the computer readable program code defining a data communication program on the personal computer wherein:*

(i) *the data communication program is operable to send a communication to a locator server computer, wherein the locator server computer is linked to a location facility and includes data for locating the personal computer; and*

(ii) *the data communication program is operable to communicate with the remote computer, the locator server computer acting as an intermediary between the personal computer and the remote computer by creating one or more communication sessions there between said one or more communication sessions being created by the location facility, in response to receipt of a request for communication with the personal computer from the remote computer, by determining a then current location of the personal computer and creating a communication channel between the remote computer and the personal computer, the location facility being operable to create such communication channel whether the personal computer is linked to the Internet directly (with a publicly addressable) dynamic IP address or indirectly via an Internet gateway/proxy (with a publicly un-addressable dynamic LAN IP address);* wherein the personal computer is linked to the Internet directly or indirectly via an Internet gateway/proxy;

wherein the personal computer is linked to a database linked to the data communication program, and said system provides means for remotely accessing said database linked to the personal computer from the remote computer;

wherein said data communication program enables communication settings associated with the data communication program to be set remotely from the remote computer for the personal computer;

wherein said data communication program enables the current location of the personal computer to be known to the locator server computer; and wherein said data communication program creates and sends the communication including the current location or the current communication session of the personal computer to the locator server computer periodically.

46. The computer program product claimed in claim [45] *26*, wherein by operation of the location facility the personal computer is operable to receive commands from the remote computer for remote control and/or remote access of the personal computer from the remote computer.

\* \* \* \* \*